US007799715B2

(12) United States Patent
Hirota et al.

(10) Patent No.: US 7,799,715 B2
(45) Date of Patent: Sep. 21, 2010

(54) BORON CARBIDE CERAMIC AND MANUFACTURING METHOD THEREOF

(75) Inventors: Ken Hirota, Kyotanabe (JP); Yoshihiro Nakayama, Kyotanabe (JP); Shingo Nakane, Kyotanabe (JP)

(73) Assignee: The Doshisha, Kyoto (JP)

( * ) Notice: Subject to any disclaimer, the term of this patent is extended or adjusted under 35 U.S.C. 154(b) by 145 days.

(21) Appl. No.: 12/209,851

(22) Filed: Sep. 12, 2008

(65) Prior Publication Data

US 2009/0082191 A1    Mar. 26, 2009

(30) Foreign Application Priority Data

Sep. 14, 2007    (JP)    ............... 2007-239028

(51) Int. Cl.
*C04B 35/563*    (2006.01)
*C04B 35/80*    (2006.01)

(52) U.S. Cl. ................ 501/87; 501/95.2; 501/95.3; 264/434; 264/640; 264/641; 264/667

(58) Field of Classification Search ............ 501/87, 501/95.2, 95.3; 264/434, 640, 641, 667
See application file for complete search history.

(56) References Cited

U.S. PATENT DOCUMENTS 7,419,925 B1 * 9/2008 Nunn ............... 501/87

7,550,401 B2 * 6/2009 Nunn ............... 501/87

OTHER PUBLICATIONS

Weiqiang Han et al., "Boron-doped Carbon Nanotubes Prepared Through a Substitution Reaction," *Chemical Physics Letters*, 299, pp. 368-373, (1999).
Hae-Won Kim et al., "Densification and Mechanical Properties of $B_4C$ with $Al_2O_3$ as a Sintering Aid," *J. Am. Ceram. Soc.*, vol. 83 [11], pp. 2863-2865, (2000).
K.M. Shorowordi et al., "Microstructure and Interface Characteristics of $B_4C$, SiC and $Al_2O_3$ Reinforced Al Matrix Composites: a Comparative Study," *Journal of Materials Processing Technology*, vol. 142, pp. 738-743, (2003).
C.W. Won et al., "Development of Functionally Graded $Al/Al_2O_3$-$B_4C$ by Pressure Assisted FACS Process," *Journal of Materials Science Letters*, vol. 21, pp. 1407-1409, (2002).

(Continued)

*Primary Examiner*—Karl E Group
(74) *Attorney, Agent, or Firm*—Foley & Lardner LLP

(57) ABSTRACT

Boron carbide ceramics produced by spark sintering methods have more desirable mechanical properties than conventionally produced carbides. The boron carbide ceramics include amorphous boron, amorphous carbon, and $Al_2O_3$ powder as a sintering aid. The boron carbides may also contain a carbon nano fiber in a nearly homogeneously dispersed state. The sintered compact has a relative density of a boron carbide ceramic of approximately not less than 99%. The boron carbide ceramics are prepared preferably by subjecting a mixed powder of the starting raw materials and the carbon nano fiber to simultaneous synthesis and sintering using the spark plasma sintering method.

8 Claims, 10 Drawing Sheets

OTHER PUBLICATIONS

F. Monteverde et al., "Processing and Properties of Zirconium Diboride-Based Composites," *Journal of the European Ceramic Society*, vol. 22, pp. 279-288, (2002).

Hailei Zhao et al., "Densification and Mechanical Properties of Mullite/$TiO^2$-coated $B^4C$ Composites," *Journal of the European Ceramic Society*, vol. 23, pp. 1485-1490, (2003).

Suzuya Yamada et al., "$B_4C$-$CrB_2$ Composites With Improved Mechanical Properties," *Journal of the European Ceramic Society*, vol. 23, pp. 561-565, (2003).

Masato Uehara et al., "SiC-$B_4C$ Composites for Synergistic Enhancement of Thermoelectric Property," *Journal of the European Ceramic Society*, vol. 24, pp. 409-412, (2004).

Yokouchi, Masahiro, "Effect of B Content on Mechanical Properties of $B_4C$/(W, Mo)$B_2$ Hard Material," *Journal of the Japan Society of Powder and Powder Metallurgy*, vol. 48, No. 7, pp. 660-664.

Atsushi Nakahira et al., "Microstructure and Mechanical Properties of SiC-Based Composites with Dispersed $B_4C$ Particles," *J. Soc. Mat. Sci.*, Japan, vol. 47, No. 6, pp. 571-575, (Jun. 1998).

\* cited by examiner

BORON CARBIDE CERAMIC AND MANUFACTURING METHOD THEREOF

CROSS-REFERENCE TO RELATED APPLICATIONS

This application claims the benefit of Japanese Patent Application No. 2007-239028 filed on Sep. 14, 2007, the entire disclosure of which is incorporated by reference.

FIELD

The present disclosure relates to boron carbide ceramics and manufacturing methods thereof.

BACKGROUND

Boron carbide ceramics have excellent properties such as light weight, high strength (for example, bending strength of 323 to 430 MPa), high hardness (for example, Vickers hardness of 27.4 to 34.3 GPa), high melting point (for example, 2400° C.), high modulus (for example, Young's modulus of 455 GPa), corrosion resistance, chemical stability, and favorable thermal and electric conductivity. FIG. 10 is a phase diagram of the carbon-boron system (hereinafter, a carbon system is referred to as "C"; and a boron system is referred to as "B"). The ordinate indicates the temperature (° C.) and the abscissa indicates the content ratio of C relative to B.

Boron carbide ceramics are currently attracting attention as high-temperature structural materials for use in, for example, engine components.

Although ceramics obtained are superior in thermal resistance, wear resistance, corrosion resistance and the like to many metal materials, ceramics have the drawback of "brittleness" that can affect the strength of the material.

Sintered ceramic composites have been used to provide increased productivity and improved mechanical properties under ordinary and high-temperature environments. As a result, there is a demand for methods for manufacturing such composites.

Methods for reducing brittleness may involve improving the sintered density of ceramics through improved manufacturing processes. For example, i) the ceramics may be mixed with a metal, ii) the particles may be dispersed, or iii) the ceramics may be reinforced with fibers.

Mixing ceramics with a metal produces ceramics having a high toughness due to their utilization of the ductility, i.e., the plastic deformation, of the composite metal. As a result, such ceramics may be unsuitable for high-temperature structural materials. Different kinds of particles may be dispersed in a ceramic matrix. Reinforcing of ceramics with fibers can result in a ceramic matrix having improved toughness, which can allow for a reduction in the weight of the ceramics.

Fiber-reinforced ceramics, which contain a principal phase (matrix, also referred to as a mother phase) and fibers as constituents, allow for the production of composite ceramics that exhibit a target performance by combining the matrix and the fibers as constituents.

SUMMARY

Boron carbide ceramics known in the art cannot provide dense materials due to poor sinterability and brittleness. That is, boron carbide ceramics known in the art have a low fracture toughness value (for example, $K_{IC}$ is 1.2 to 3.6 MPa·$m^{1/2}$). Thus, there is a need for more reliable boron carbide ceramics.

Further, the ceramic matrix composite materials fabricated from boron carbide as a matrix are not readily dispersed with particles and fibers. This results in problems with homogeneity of the final products, and with the strength of the composites.

Dense ceramics of not less than 99% are provided that can easily be produced by fabricating a dense powder compacted from a homogeneous mixture of an amorphous boron, an amorphous carbon, and a trace amount of $Al_2O_3$ as a sintering aid. The mixture is heated under pressure using a spark plasma sintering method to subject the mixture to simultaneous synthesis and sintering.

In one aspect, manufacturing methods include homogenously dispersing a high-strength electric conductor, such as a carbon nano fiber (CNF), in the above-mentioned powder compact from the mixed raw materials, and sintering the mixture by a spark plasma sintering method. High-density boron carbide $B_4C$ in which CNF is homogeneously dispersed can be produced with such methods. The mechanical properties of such $B_4C$ materials are improved over those known in the art.

In one aspect, the boron carbide ceramics are prepared from the starting raw materials, including an amorphous boron, an amorphous carbon, and an $Al_2O_3$ powder as a sintering aid, and further including a carbon nano fiber in a nearly homogeneously dispersed state in the starting raw materials. The sintered compact ceramic has a relative density as a boron carbide ceramic of approximately not less than 99%. Such a material is referred to as a CNF-added boron carbide composite ceramic.

In some embodiments, 3% to 15% by volume of the carbon nano fiber is contained in internal proportion to the boron carbides.

In another aspect, boron carbide ceramics include a carbon nano fiber as a starting raw material in place of the amorphous carbon. Such a boron carbide ceramic is referred to as a CNF-dispersed boron carbide composite ceramic.

In some embodiments, the boron carbide ceramic (the CNF-added boron carbide composite ceramic or the CNF-dispersed boron carbide composite ceramic) is prepared by subjecting a mixed powder of the starting raw materials and the carbon nano fiber to simultaneous synthesis and sintering using the spark plasma sintering method.

In another aspect, a method is provided for manufacturing boron carbide ceramics. In some embodiments, the method includes: weighing and preparing the starting raw materials including an amorphous B, an amorphous C, and an $Al_2O_3$ powder as a sintering aid; subjecting 3% to 15% by volume of a carbon nano fiber in internal proportion to boron carbide to a dispersion treatment in water or methanol, and thereafter adding the resultant dispersion to the starting raw materials; dispersing and wet-mixing the starting raw materials and the carbon nano fiber in water or alcohol, and then drying the resultant mixture to obtain a mixed powder; and heating the mixed powder to raise the temperature thereof while providing pressure to the mixed powder by the spark plasma sintering method to subject the mixed powder to simultaneous synthesis and sintering to directly obtain a boron carbide ceramic.

In some embodiments, the pressing and heating by the spark plasma sintering method includes heating the mixed powder in a vacuum of not more than 10 Pa to a temperature of 1,500 to 1,800° C. for 1 to 60 min., while pressing the mixed powder at a pressure of 10 to 100 MPa.

In some embodiments, carbon nano fibers are used as a starting raw material in place of the amorphous C.

Definitions of Terms

In the present specification, "a carbon nano fiber" indicates a carbon fiber having a nanosize diameter. In some embodiments, such carbon fibers may have a diameter of about 10 nm to about 500 nm, from about 100 nm to about 250 nm, or about 150 nm. In other embodiments, the fiber length is about 4 to 5 μm, and the density is about 2.00 Mg/m$^3$. In yet other embodiments, the fibers have a tensile strength of about 2.20 GPa, and a modulus of about 100 to 300 GPa.

Carbon nano fibers in a matrix impart high strength, high toughness, and weight reduction of composite materials. Where a single phase of a matrix is an insulator, conductivity may be imparted to the matrix by the addition of carbon nano fibers.

For example, if a carbon nano fiber has a larger expansion coefficient in the radial direction than in the axial direction, it tends to resist elongation and has a higher tensile strength. A lager minus value of a difference in expansion coefficient between a matrix and a fiber induces a compression residual stress to the matrix and a tensile residual stress to the fiber, thus functioning to suppress crack generation of the matrix.

Characteristics of composite ceramics can change depending on the diameter of the carbon nano fibers. When carbon nanofiber is used as a reinforcing fiber, both the strength and toughness are simultaneously improved. These materials are generally called ceramic nanocomposites. Nano-phase carbon materials typically include fullerenes, carbon nano tubes (CNT) and CNFs.

The development of high-strength and light-weight carbon fibers has been ongoing for 40 years or more, and carbon fibers have been utilized in composite materials for aircrafts, sports implements and the like. Although such fibers have a very large modulus E and a very high tensile strength $\sigma_t$ (fiber: 2 to 5 GPa, whisker: 20 GPa), since they have many lattice defects, the strength is confined to a lower value than the theoretical maximum strength.

By contrast, both CNT and CNF have a tensile strength and a modulus surpassing conventional fibers, and exhibit excellent mechanical strengths due to their nano-scale thin cylindrical structure.

As described, studies on preventing catastrophic fracture in high-temperature environments have included fabricating ceramic matrix composite materials (CMC) by reinforcing ceramics with various types of carbon fibers and ceramic fibers. CNFs exhibit excellent physical and mechanical strength, but since CNFs have poor dispersibility, and because it is difficult to control the bonding force at the matrix interface in CNFs, providing CNF-added and dispersed CMC is difficult, and has not previously been achieved.

Pulsed electric-current pressure sintering (PECPS) methods, or spark plasma sintering (SPS) methods, are disclosed, in which raw material powders are filled in a conductive die and heating is performed, for example, by an on-off pulse direct current flow in the die in a uniaxially pressing state.

If the powder has high electric conductivity, the current flows evenly in the green compact, and spark plasma is induced in gaps between particles. This locally heats the particle surfaces to a very high temperature. Since the particle surface is activated and sinterability is improved by this plasma treatment, the method can be applied to the densification of poorly sinterable substances, solidification of powder materials necessitating low-temperature sintering, and combustion bonding.

In contrast with the conventional method in which heating is performed from the outside, for example, by a heater, the SPS method, as described above, utilizes a large pulse current (for example, not less than several hundreds of amperes) flow in the powder, causing sparks in the slight gaps between the powder particles. The sparks heat and sinter the powder particles.

Therefore, since the SPS method can heat and sinter at a lower temperature and more rapidly and uniformly than conventional methods such as the electric furnace sintering methods and hot press (HP) methods, control of the fine texture in which the grain growth is suppressed is possible. Thus, the SPS method is capable of fabricating high-performance, sintered compacts.

In the present specification, "simultaneous synthesis and sintering" indicates the fabrication of a dense sintered compound from a homogeneous mixture of starting raw materials.

Through the direct synthesis of a compound from a mixed raw material powder using the SPS method as described above, the boron carbide ceramics were sintered densely (relative density of about 99%) in a short time, at 1,800° C. This is a low sintering temperature for boron carbide ceramics. The boron carbide ceramics exhibit a high, three-point bending strength, $\sigma_b$, of 610 MPa.

In composite ceramics in which 15% by volume of CNF is added and homogeneously dispersed throughout the boron carbide ceramics, the bending strength, $\sigma_b$, increased up to 710 MPa; the hardness, $H_v$, is improved up to 36 GPa from 29 GPa with no CNF addition; and the fracture toughness value, $K_{IC}$, is increased about 1.6 times up to 7.6 MPa·m$^{1/2}$. Without the addition of 15% CNF, a $K_{IC}$ of the material is about 4.9 MPa·m$^{1/2}$. See FIG. 9.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a diagram illustrating the process for preparing the boron carbide ceramics using the SPS method, according to one embodiment.

FIG. 2 is a conceptual diagram illustrating a system structure of an SPS apparatus used for manufacturing the boron carbide ceramics, according to one embodiment.

FIG. 3 is a graph of the temperature and displacement in the Z direction of a mixed green compact when the mixed green compact includes the starting raw materials of an amorphous B, an amorphous C, and an Al$_2$O$_3$ powder as a sintering aid, and is pressed and heated by the SPS method.

FIG. 4 is an XRD pattern of the boron carbide composite ceramics obtained by sintering at 1,800° C.

FIG. 5 is an XRD pattern of the boron carbide composite ceramics obtained by sintering at 1,800° C. in the case where the addition amount of CNF is changed.

FIGS. 6(*a*), (*b*), (*c*) and (*d*) are SEM photographs of the micro structure of boron carbide composite ceramics obtained by sintering at 1,800° C. in the case where the addition amount of CNF is changed.

FIG. 7 is an XRD pattern of the boron carbide composite ceramics obtained by sintering at 1,800° C. in the case where the addition amount of CNF is changed.

FIG. 8 (A), (B), (C), (D), (E), and (F) are SEM photographs of boron carbide composite ceramics obtained by sintering at 1,800° C. in the case where the addition amount of CNF is changed. In each of the figures the noted scale is equivalent to 1 μm. In (A) B:CNF is 4:0.6. In (B) B:CNF is 4:0.8. In (C)

B:CNF is 4:1. In (D) B:CNF is 4:1+CNF 5 vol %. In (E) B:CNF is 4:1+CNF 10 vol %. In (F) B:CNF is 4:1+CNF 15 vol %.

Figure 9A:
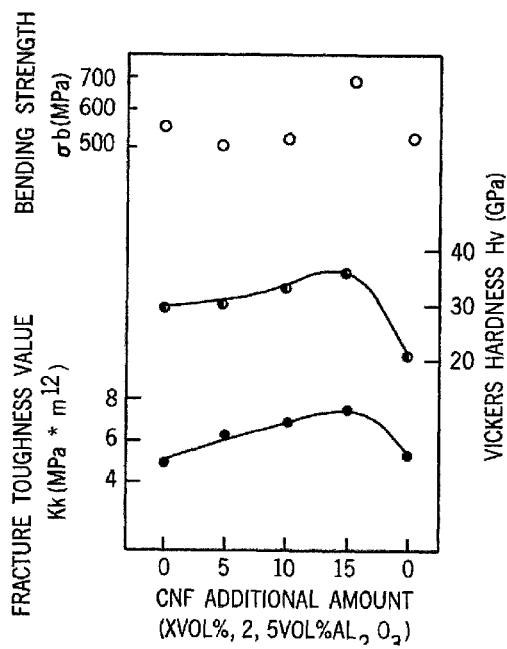

FIGS. 9(a) and (b) are diagrams of various mechanical properties of boron carbide composite ceramics obtained by adding CNF.

Figure 10:
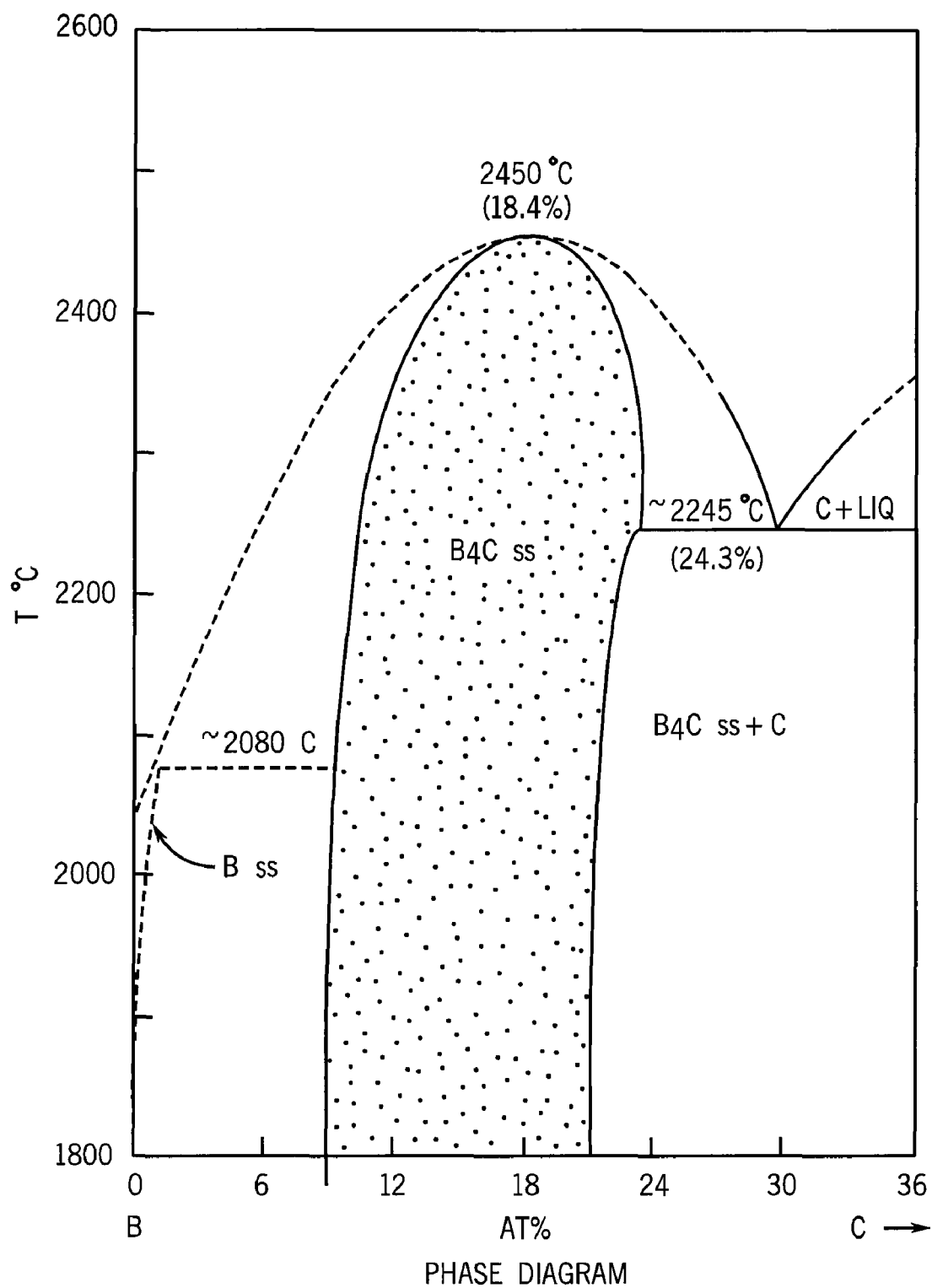

FIG. 10 is a phase diagram of a boron carbide ceramic.

DESCRIPTION OF ILLUSTRATIVE EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The following embodiments are illustrative, and it is understood that the disclosure is not limited to the disclosed illustrative embodiments only. The technology may be practiced in various embodiments without departing from the spirit and the scope of the present disclosure. Hereinafter, the illustrative embodiments will be described by way of the accompanying drawings.

In one aspect, boron carbide ceramics (CNF-added boron carbide composite ceramics) are reinforced by adding an appropriate amount of CNF to the starting raw materials and sintering the mixture by the SPS method. In another aspect, boron carbide ceramics (CNF-dispersed boron carbide composite ceramics) are obtained by using CNF in place of the amorphous C in the starting raw materials and similarly sintering the mixture by using the SPS method.

In another aspect, the boron carbide sintered ceramics are prepared from a mixed powder of a predetermined composition obtained by weighing and mixing the starting raw materials.

In one aspect, a procedure is provided for preparing CNF-added boron carbide composite ceramics using the SPS method.

Figure 1:
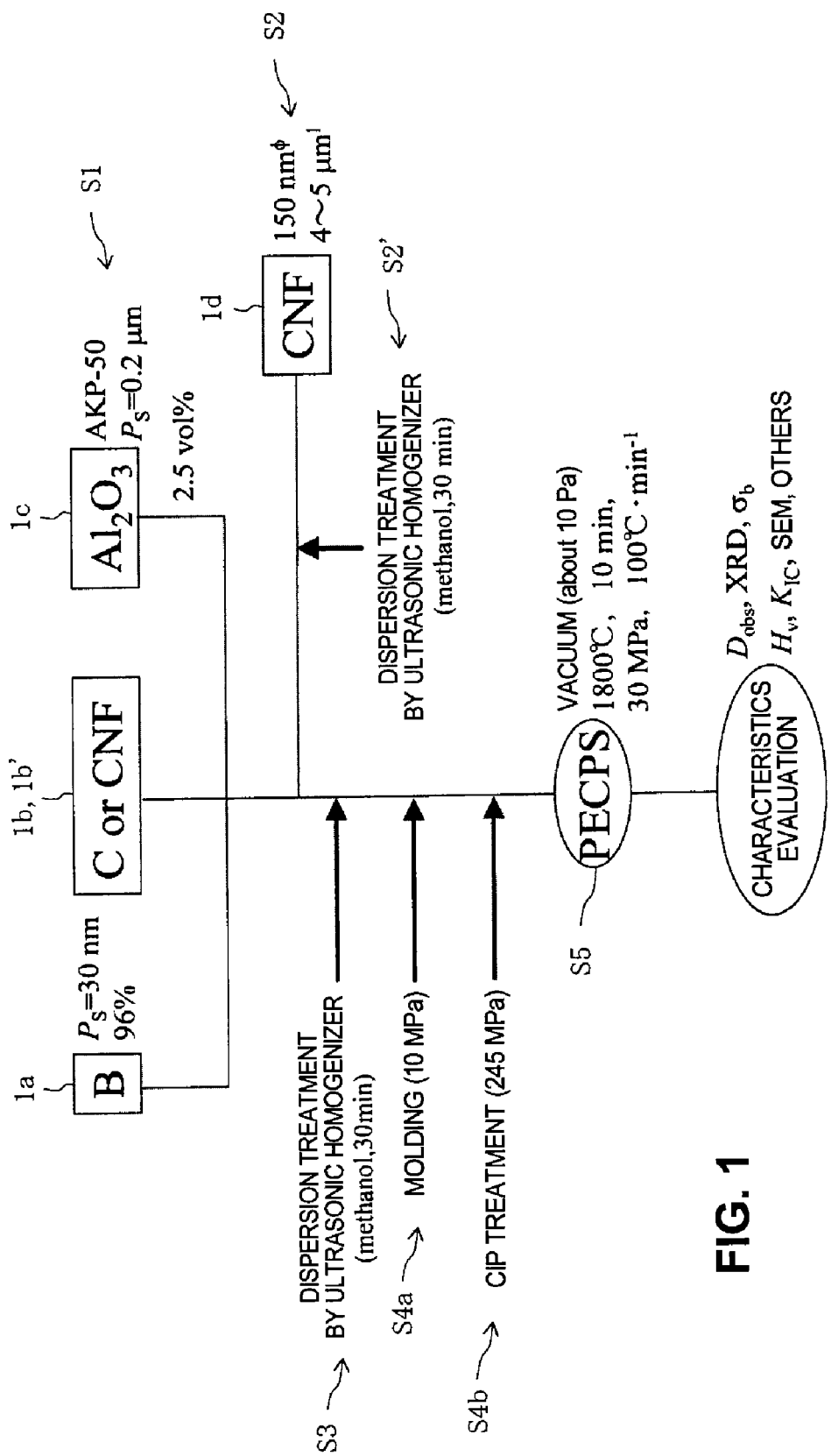
FIGS. 1-10 depict illustrative embodiments of boron carbide ceramic.

FIG. 1 is an illustration of a process for preparing boron carbide ceramics by the SPS method (CNF-added boron carbide composite ceramics or CNF-dispersed boron carbide composite ceramics). Numerical values, sintering conditions and the like described in the figure correspond to numerical values used in Examples 1 and 2 described herein, and the disclosure should not be considered limited thereby.

In some embodiments, the process includes weighing the starting raw materials (S1). The starting raw materials include an amorphous B, an amorphous C, and an $Al_2O_3$ powder as a sintering aid. In some embodiments, the $Al_2O_3$ has an average particle diameter, $P_s$, of about 0.2 μm and a volume content of about 2.5%. In some embodiments, B has a purity of about 96%. The amount of the sintering aid may be optionally adjusted.

In some embodiments, 3% to 15% by volume of CNF as a reinforcing agent is added to the above-mentioned powders (S2). At this stage, after the CNF is dispersed in water or methanol by means of an ultrasonic homogenizer or others (S2'), the CNF dispersion is added to the starting raw materials.

In step S3, the starting raw materials containing the CNF are dispersed and wet-mixed in water or alcohol, and then dried to obtain a mixed powder. To become a sintering object, the obtained mixed powder is subjected, as required, to powder compacting (S4a) and hydrostatic pressing (S4b), and then is heated while being pressed by the SPS method (S5).

The SPS method is a sintering method in which a large pulse direct current at a low voltage is input to instantly generate a high energy by the spark discharge phenomenon. This causes melting and high-speed diffusion by rapid Joule heating, and provides a dense, sintered compact exhibiting suppressed grain growth. This process occurs over a short time and at a relatively low temperature.

The SPS method can be used to sinter poorly sinterable material. Benefits of utilizing the SPS method include a short sintering time, improved ceramic mechanical properties such as hardness, ability to readily control the microstructure of a sintered compact, ability to provide for a wide range of sinterable materials, and applicability to objects having no conductivity.

Figure 2:
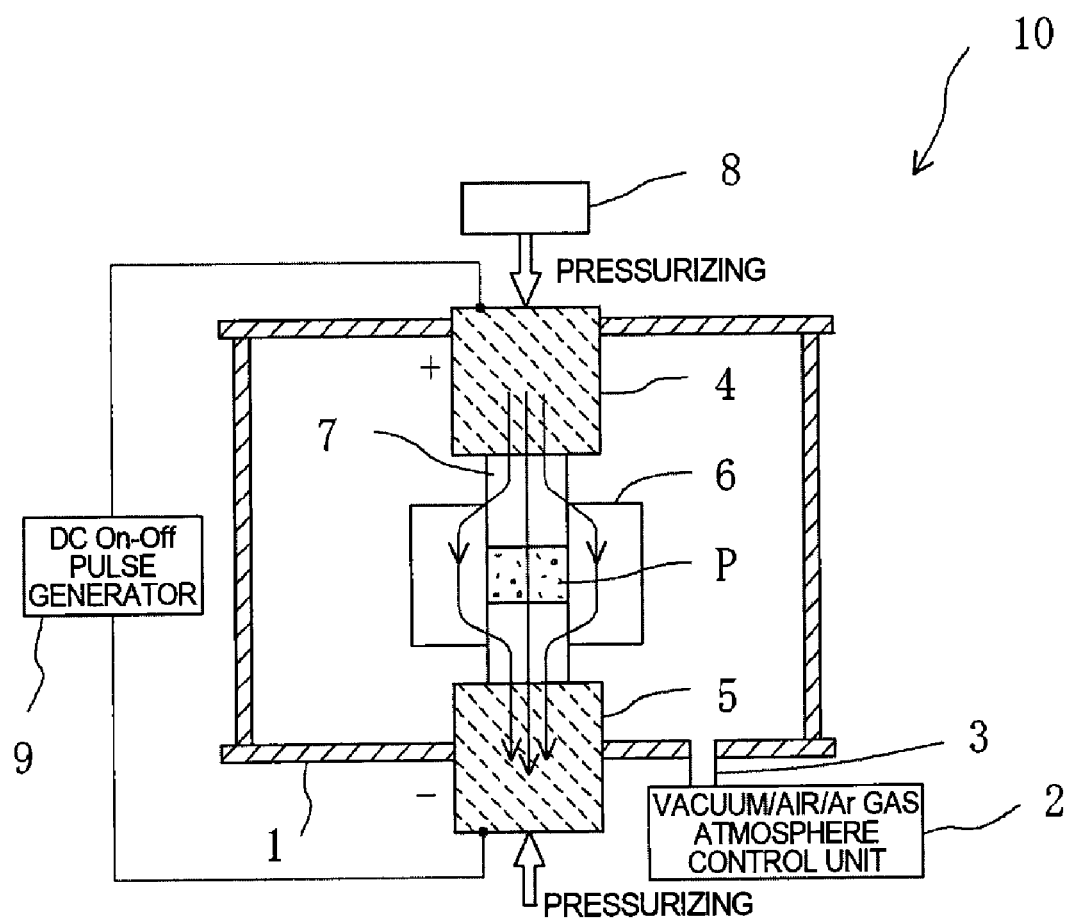

The outline of a spark plasma sintering apparatus is shown in FIG. 2. Here, a powder compact P of the raw materials, 1a to 1d, in FIG. 1, is set in a carbon molding die 6 installed in a vacuum chamber 1.

The spark plasma sintering apparatus 10 shown in FIG. 2 includes a vacuum chamber 1, a pulse current generator 9, upper and lower electrodes 4 and 5, a pulse current generator 9, a pressing means 8, a plunger 7, and a molding die 6. The upper and lower electrodes 4, 5 are connected to the pulse current generator 9. The pressing means 8 is configured to press the upper and lower electrodes 4, 5 and to press the powder compact P through the plunger 7. The plunger 7 transmits the pressing force to the powder compact P in the molding die 6.

In the examples, the molding die 6 and the plunger 7 are made of carbon. The vacuum chamber 1 and the electrodes 4, 5 may be cooled with water. The pressing means 8 is composed of, for example, a load cell. A vacuum/air/Ar gas atmosphere control unit 2 is connected to the vacuum chamber 1 through an introducing pipe 3, which is configured to be able to flexibly control the internal atmospheric pressure.

According to one embodiment, and as described above, the SPS method involves sintering an object by inserting the object in a carbon molding die and pressing the object while applying a voltage of about 10 V and a pulsed current of not less than several hundreds of amperes. Concurrently, the carbon-made molding die is heated and spark plasmas are generated at contact points between the powder particles, thus promoting sintering.

The application of this method to the preparation of ceramics allows sintering at a temperature 200° C. to 500° C. lower for a shorter time (several minutes to several tens of minutes) than conventional electric furnaces and the like. Further, this method can be applied to the sintering of composites with poor sinterability. Thus, the method is an effective means for fabricating microstructures of nanoscale size and for synthesizing nano composites.

The conditions required for pressing and heating by the above-mentioned SPS method vary depending on the amount and quality of the mixed powder. In some embodiments, pressing is done at a pressure of 10 to 100 MPa in a near vacuum of not more than 10 Pa, during heating at a temperature of 1,700 to 1,800° C. for 1 to 60 min.

By the processes above, boron carbide ceramics can be fabricated by directly subjecting the mixed powders, including an amorphous B and an amorphous C, to simultaneous synthesis and sintering.

According to one embodiment, dense boron carbide ceramics having a relative density of not less than about 99% as boron carbide ceramics can be obtained. The evaluation of the mechanical properties of the obtained boron carbide ceramics (S6) is described in the examples below.

In another embodiment, CNF-dispersed boron carbide composite ceramics are obtained using a carbon nano fiber as a starting raw material in place of the above-mentioned amorphous C. A process diagram and the outline of the spark plasma sintering apparatus are described in FIGS. 1 and 2. In such embodiments, 3% to 15% by volume of CNF to the starting raw materials (S2) is used. After the CNF is dispersed in water or methanol by means such as an ultrasonic homogenizer or others (S2'), the CNF is added to the starting raw materials. The powders containing the starting raw materials and CNF are then dispersed and wet-mixed in water or alcohol (S3), and dried to obtain the mixed powders for sintering.

The obtained mixed powders are subjected to uniaxial compression molding (S4a) and hydrostatic pressing (S4b), and then to the simultaneous synthesis and sintering using the SPS method (S5). This method produces a boron carbide ceramic sintered compact (a CNF-dispersed boron carbide composite ceramic) containing a carbon nano fiber in a nearly homogeneously dispersed state.

EXAMPLES

The present technology is further illustrated by the following examples, which should not be construed as limiting in any way.

In Example 1, boron carbide ceramics (CNF-added boron carbide composite ceramics) are reinforced by adding an appropriate amount of CNF to the starting raw materials and subjecting the mixture to the simultaneous synthesis and sintering by using the SPS method were actually prepared.

In Example 2, boron carbide ceramics (CNF-dispersed boron carbide composite ceramics) are obtained by using a carbon nano fiber as a starting raw material in place of the amorphous C and similarly subjecting the mixture to simultaneous synthesis and sintering.

FIGS. 3 to 9 illustrate various properties relevant to the boron carbide ceramics (CNF-added boron carbide composite ceramics or CNF-dispersed boron carbide composite ceramics) obtained by the SPS method.

Simultaneous Synthesis and Sintering of a Boron Carbide Ceramic and Mechanical Properties As described above, boron carbide ceramics are brittle and are hard to sinter to a theoretical density. As a result, various improvements in sintering and processing methods are desired, including fabrication of a sintered compact having a high density and excellent in mechanical properties; and fabrication of precision components from the high-hardness materials thus obtained.

Example 1

Preparation of a Powder and a Sintered Compact

An amorphous B, an amorphous C, and an $Al_2O_3$ powder (AKP-50, purity: 99.9%, particle diameter $P_s$: 0.2 μm, made by Sumitomo Chemical Co., Ltd.) as a sintering aid were used as starting raw materials. Each powder was weighed to provide a boron carbide ceramic as a sintered compact (S1 in FIGS. 1; 1a, 1b and 1c).

In this Example, CNF as a reinforcing material (VGCF-H, purity: 99%, diameter: not more than 150 nm, length: 4 to 5 μm, made by Showa Denko K.K.) was added to the mixture of powders (S2 in FIG. 1; 1d) as a dispersion. The amount of CNF added was about 3% to 15% by volume, in internal proportion to the boron carbide.

The CNF dispersion was prepared by subjecting the CNF and methanol to a 30-min treatment in an ultrasonic homogenizer (frequency: 20 kHz, output: 300 W) (S2').

Thereafter, 3% to 15% by volume of the CNF having been subjected to the treatment (S2') was added to the slurry of the mixed powder of the starting raw materials according to S1, and similarly wet-mixed and subjected to a 30-min. dispersion treatment (S3).

In the dispersion treatment of S3, the mixed powder, including the weighed powder of S1 and the added CNF, was added to methanol and wet-mixed using a planetary ball mill (zirconia ball (2 mm)). The obtained mixture was then dried at room temperature. The dried mixture was then subjected to a uniaxial die molding (98 MPa) and a hydrostatic pressing treatment (245 MPa) in a carbon molding die (40-15-40 mm) installed in a spark plasma sintering apparatus (SPS-510A, made by Sumitomo Coal Mining Co., Ltd.) as shown in FIG. 2 (6 in FIG. 2).

Thereafter, the filled powder was sintered by applying a DC pulse current (ON/OFF=12:2) to the powder while the powder was being uniaxially pressed (30 MPa) in a vacuum (about 10 Pa). The temperature was raised at a rate of 100° C./min and was held at a temperature of 1,500 to 1,800° C. for 10 min. The temperature was then lowered at a rate of about 50° C./min (S5 in FIG. 1).

A 3 mm hole was then opened in the molding die in FIG. 2 from the outside, up to about 5 mm to the mixed green compact P. The temperature of the bottom of the hole was measured using a monochromatic thermometer. The shrinking amount in the pressing axis (Z axis) of the green compact during pressing, and while the temperature was rising, was measured. The sample obtained while the temperature was rising was quenched and removed. The crystalline phase was identified by X-ray diffraction (XRD, (Rint2000, $CuK_{\alpha 1}$, made by Rigaku Corp.)), and the microstructure was observed with an SEM (FE-SEM, (JSM7000, made by JEOL Ltd.)).

Evaluation of the Powder and the Sintered Compact

The surfaces of the obtained sintered compacts were evaluated using SEM photographs. It was found that the mixed powder of the boron carbide caused coarsening of the particles and did not cause densification; however, the compositions of boron carbide and CNF were sintered to a high density (due to the action of the CNF) (see FIG. 6 and FIG. 8).

FIGS. 3(a) and 3(b) respectively illustrate the displacement of the Z axis and the temperature of the mixed green compact (B:C=4:1 mol ratio) in which an amorphous B, an amorphous C, and 2.5% by volume of an $Al_2O_3$ powder, as a sintering aid are pressed as the temperature is raised from room temperature to 1,800° C. under pressing, respectively.

Figure 3:
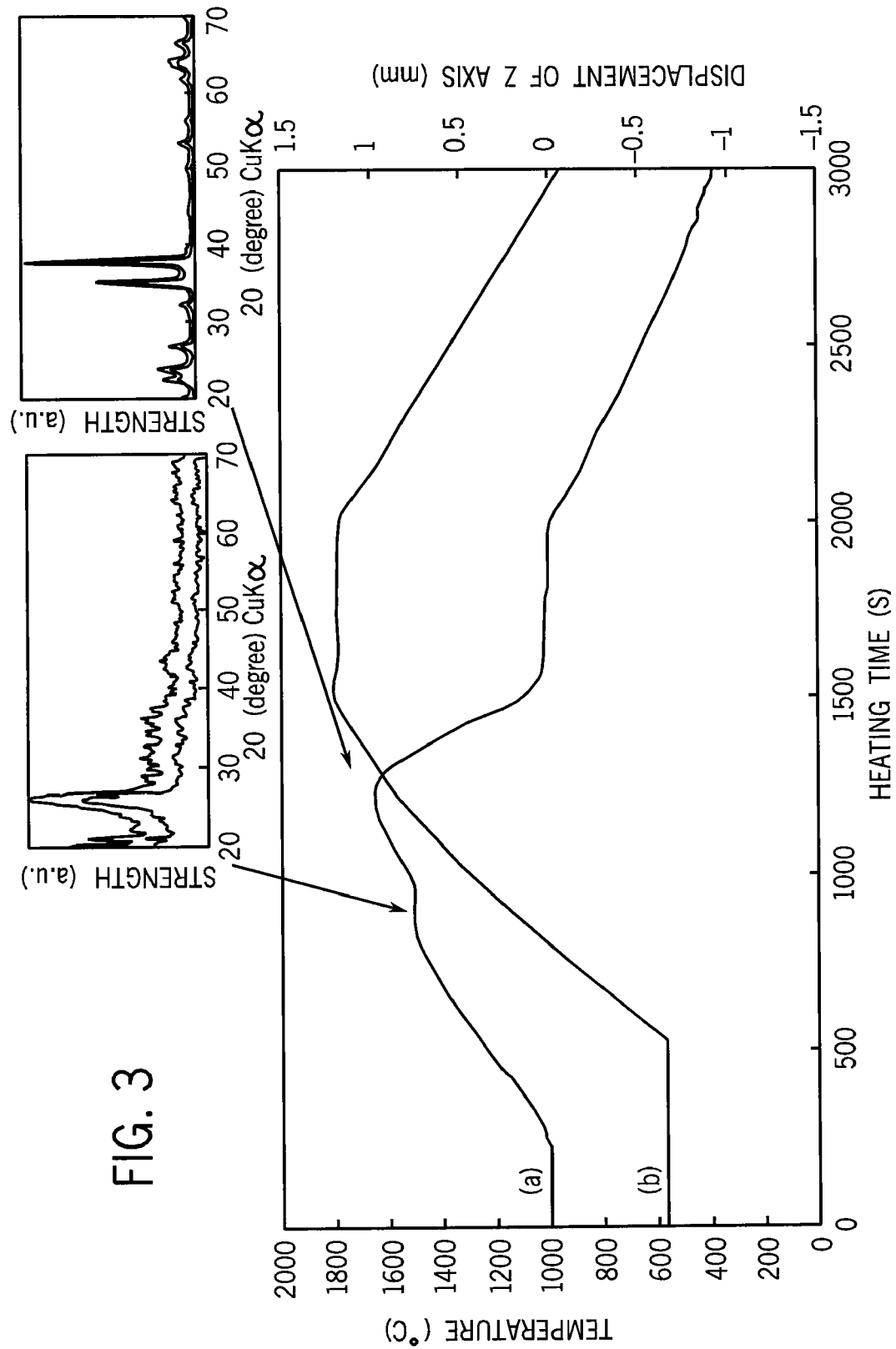

The trends shown in FIG. 3 can be seen in the boron carbide ceramics (the CNF-added boron carbide composite ceramics and the CNF-dispersed boron carbide composite ceramics). The expansion of the green compact started at about 600° C. and a sharp shrinkage occurred at 1,500° C. to 1,800° C. Also in FIG. 3(b), a slight deviation (temperature rising) from the programmed temperature rising rate due to the heat generation of the sample is observed. The self-propagating high-temperature synthesis (SHS) of the boron carbide is assumed to occur at the relatively low temperature of 1,500° C. to 1,800° C. during heating and temperature rising of SPS corresponding to the above-mentioned shrinkage.

In the SPS process, since ON/OFF pulses of a large direct current are induced between the particles of the mixed green compact simultaneously with the heating, SHS should sustainably occur even in a high-melting point inorganic compound exhibiting an exothermic reaction during production. This direct production of a boron carbide ceramics from the mixed green compact does not occur in ordinary hot presses at such low temperatures.

Mechanical Properties of the Sintered Compact

FIG. 9 illustrates various properties relevant to the boron carbide ceramics obtained using the spark plasma sintering method. FIG. 9(a) shows the dependence of three-point bending (flexural) strength $\sigma_b$, Vickers hardness $H_v$ and fracture toughness value $K_{IC}$ on the addition of an amount of CNF. The data indicate average values of ten samples. The compositions were boron carbide ceramics of CNF-added boron carbide composite ceramics. The Vickers hardness $H_v$ of the boron carbide ceramics gradually increases with increasing CNF amounts. A maximum value of 36 GPa at 15% by volume of the CNF is shown. The maximum value of the $H_v$ is improved over the value of $H_v$ (29 GPa) where no CNF is added.

The bending strength, $\sigma_b$, and the fracture toughness value, $K_{IC}$, have maximum values of 710 MPa and 7.6 MPa·m$^{1/2}$, respectively, at 15% by volume of CNF.

It is clear that the boron carbide ceramics fabricated in 15% by volume CNF addition exhibit good mechanical properties, as evidenced by the bending strength, $\sigma_b$ (710 MPa), Vickers hardness, $H_v$ (36 GPa), and fracture toughness, $K_{IC}$ (7.6 MPa·m$^{1/2}$).

Example 2

A CNF-dispersed boron carbide composite ceramic is prepared using a carbon nano fiber as a starting raw material in place of the amorphous C in Example 1, by simultaneous synthesis and sintering. Sintering was performed under the conditions described in Example 1.

Figure 7:
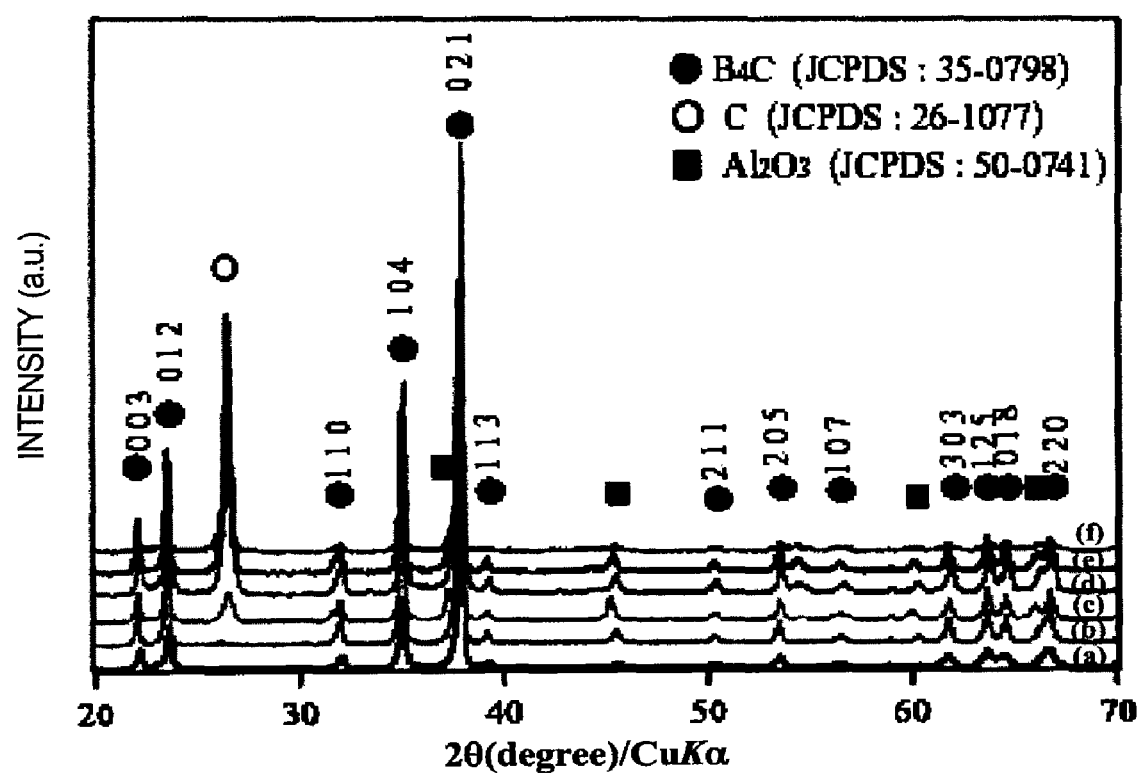
Figure 8:
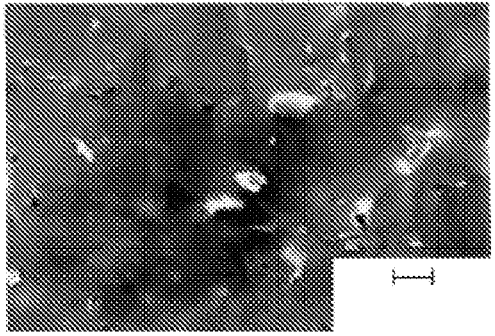
Figure 8:
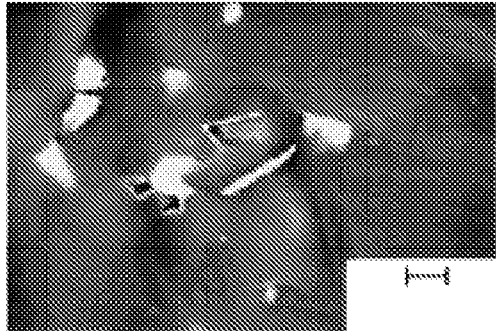
Figure 8:
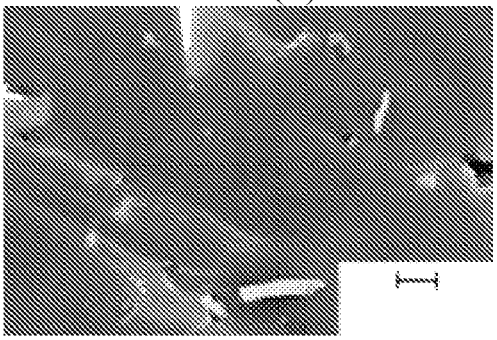
Figure 8:
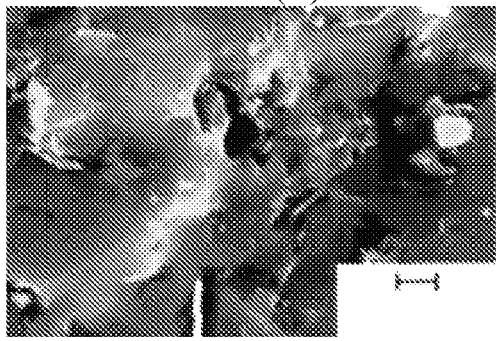
Figure 8:
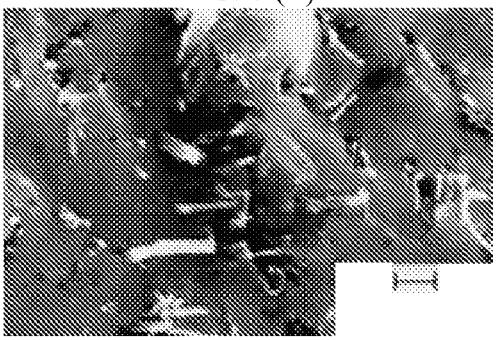
Figure 8:
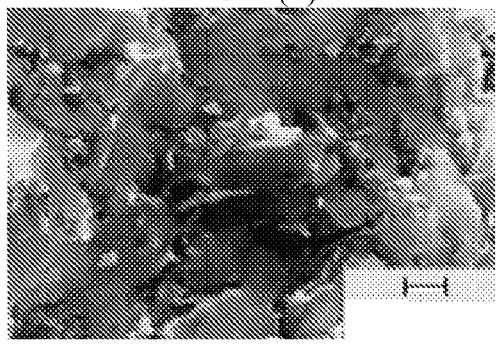

FIGS. 7, 8 and 9 are diagrams showing changes in various properties of the CNF-dispersed boron carbide composite ceramics depending on the CNF addition amount.

Evaluation of the Powder and the Sintered Compact

From the SEM photograph of the fracture surface of the sintered compact, it can be seen that the CNF maintains a nano shape and structure, and is condensed (relative density: about not less than 99%) in a favorably dispersed state (see FIG. 8).

Mechanical Properties of the Sintered Compact

Figure 9B:
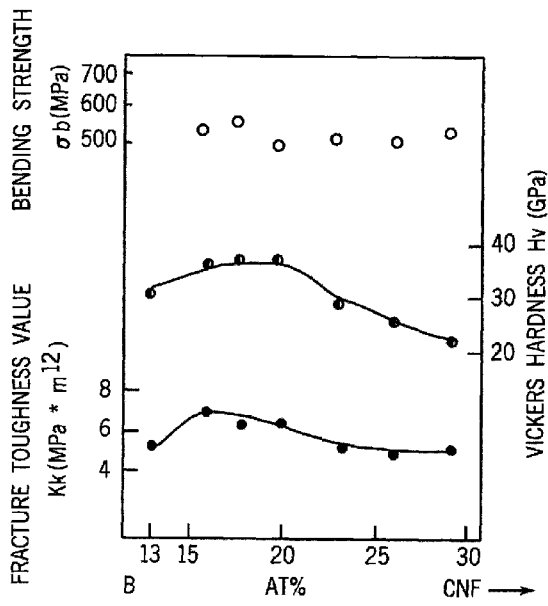

In FIG. 9(B), changes in the electric resistance and various mechanical properties of the CNF-dispersed boron carbide composite ceramics, depending on the CNF addition amount, are shown. The three-point bending strength, $\sigma_b$, is about 583 MPa; the Vickers hardness, $H_v$, is about 36.5 GPa; and the fracture toughness value, $K_{IC}$, is about 6.76 MPa·m$^{1/2}$.

Comparative Evaluation of the Samples Obtained in Examples 1 and 2

Figure 4:
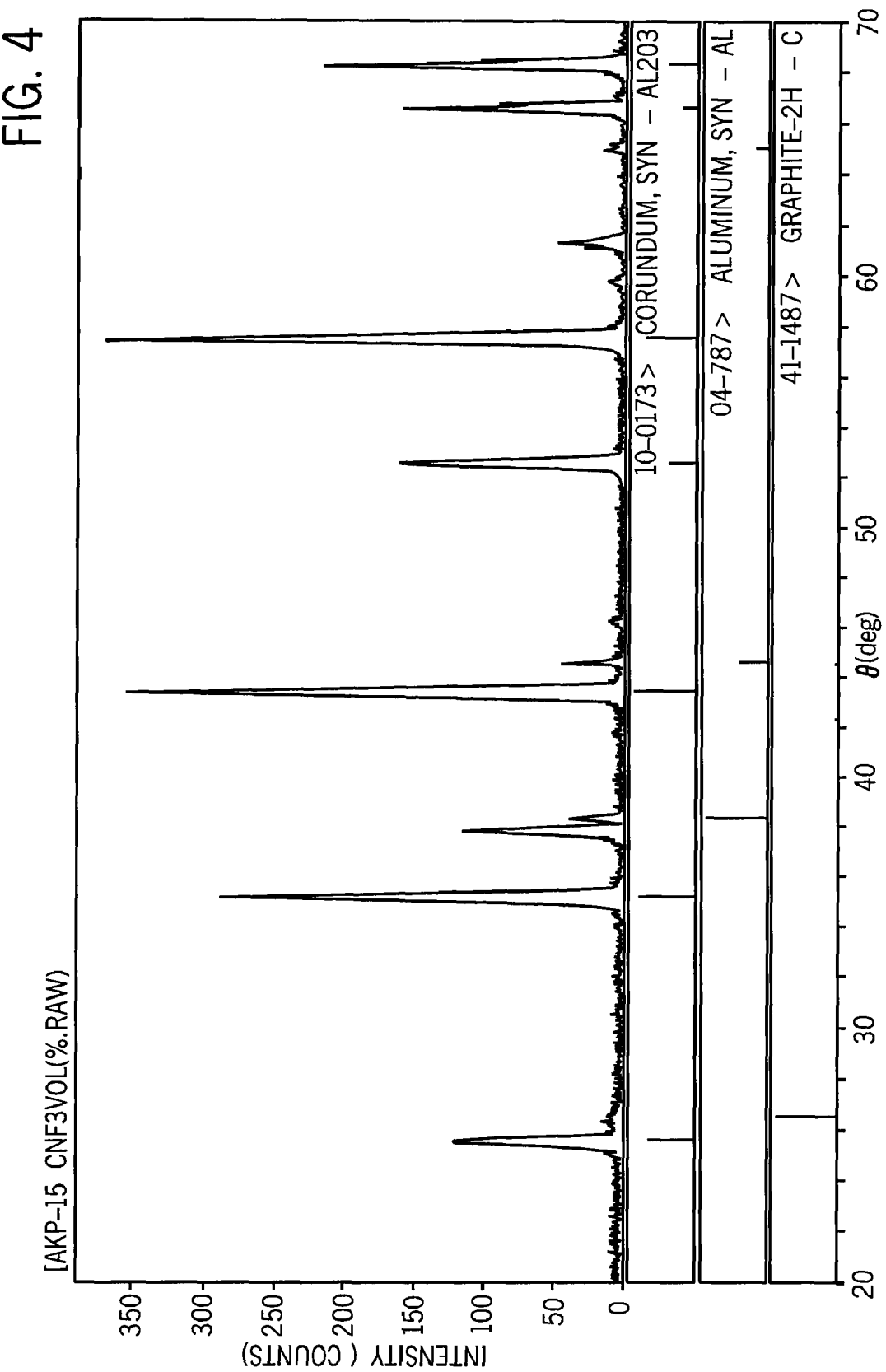
Figure 5:
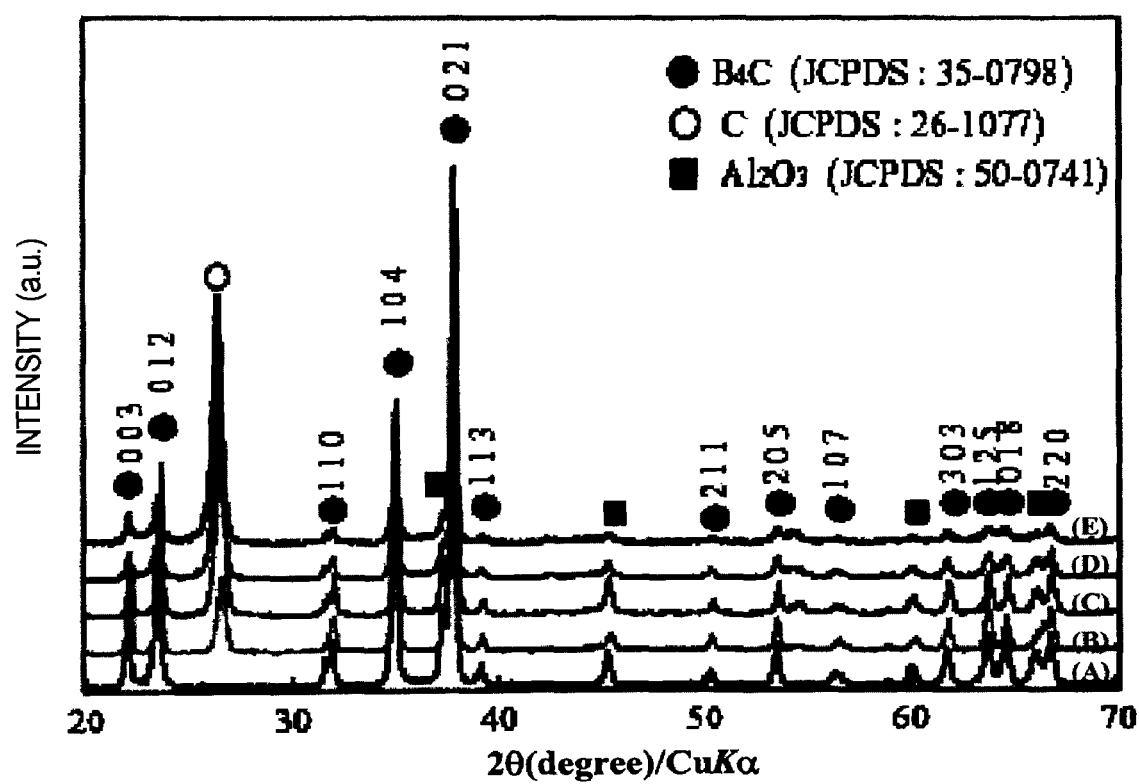
Figure 6A:
Figure 6B:
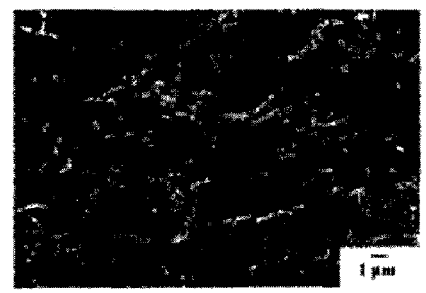
Figure 6C:
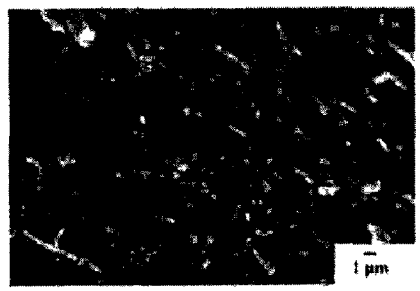
Figure 6D:

XRD patterns of the sintered compacts are shown in FIGS. 4, 5 and 7. In FIG. 4, the addition amount of CNF was 3% by volume. In FIG. 5, the addition amount of Al$_2$O$_3$ was 2.5% by volume; the addition amounts of CNF were (A) 0% by volume, (B) 5% by volume, (C) 10% by volume, (D) 15% by volume and (E) 20% by volume. In FIG. 7, the addition amount of Al$_2$O$_3$ was 2.5% by volume; the addition amounts of CNF were (a) 14 at %, (b) 17 at %, (c) 20 at %, (d) 23 at % and (e) 26 at %. In the XRD patterns shown in FIGS. 4, 5 and 7, the diffraction peak of C includes the diffraction peak of CNF (CNF does not affect C).

In the Boron carbide ceramics produced at 1,800° C., and in the samples in which a carbon nano fiber was added, only diffraction peaks of boron carbide ceramics and CNF were observed.

SEM photographs of fracture surfaces of composites in which an appropriate amount of a carbon nano fiber was added are as shown in FIGS. 6 and 8. In FIG. 6, the addition amount of Al$_2$O$_3$ was 2.5% by volume; the addition amounts of CNF were (A) 5% by volume, (B) 10% by volume, (C) 15% by volume and (D) 20% by volume. The sintering was done at 1,800° C. for 10 min. In FIG. 8, the addition amount of Al$_2$O$_3$ was 2.5% by volume; the addition amounts of CNF were (A) 14 at % (B:CNF=4:0.6), (B) 17 at % (B:CNF=4:0.8), (C) 20 at % (B:CNF=4:1), (D) 23 at % (B:CNF=4:1+5% by volume of CNF), (E) 26 at % (B:CNF=4:1+10% by volume of CNF) and (F) 29 at % (B:CNF=4:1+15% by volume of CNF).

The SEM photographs show that the carbon nano fiber did not inhibit the densification, and that, in all cases, dense, sintered compacts having a relative density of about not less than 99% were provided.

The samples in which 5 to 15% by volume of the carbon nano fiber was added provided a dense sintered compact in which the carbon nano fiber was homogeneously dispersed and the grain growth of the matrix had been suppressed. By contrast, the sample in which 20% by volume of the carbon nano fiber was added exhibited localization of portions where the grain growth had remarkably been suppressed and loss of the homogeneity was observed. That is, in the same portions grain growth suppression was not observed, and the addition ratio of carbon nano fiber has a useful effect.

Three-Point Bending Strength ($\sigma_b$)

The measurement results of three-point bending strengths ($\sigma_b$) are shown in FIGS. 9(A) and 9(B). The three-point bending strengths ($\sigma_b$) increase when the addition amount of the carbon nano fiber is also increased. With no CNF addition, $\sigma_b$ is about 550 MPa, but the sample in which 15% by volume of the carbon nano fiber was added provided a maximum value of about 710 MPa. However, in the sample in which 20% by volume of the carbon nano fiber was added, $\sigma_b$ decreased to about 510 MPa. Thus, similar to the homogeneity and denseness of the texture, the addition ratio of a carbon nano fiber has a useful effect. As described herein, a sintered compact having a high density and a dense microstructure can be fabricated by directly synthesizing a compound from a raw material mixed powder by using the spark plasma sintering method. Further, it was confirmed that adding a carbon nano fiber as a reinforcing material can produce a higher toughness. Such sintered compacts may be used in applications requiring corrosion resistance, such as precise components of chemical plants, engine combustion subchambers, valves, turbocharges, gas turbines, and the like.

An engine combustion subchamber is an apparatus for aiding combustion. Fuel and air are introduced to a high-temperature section, i.e., the combustion subchamber, to fully perform the carburation and mixing. Such parts must withstand high temperature, rapid heating and quenching, explosive pressures, mechanical stresses, and thermal stresses.

A valve is used for mounting on the cylinder head of an engine and closing the combustion chamber. Valves must withstand high temperature, rapid heating and quenching, contact with a reactive gases, and have good wear resistance against microparticles. The valves are exposed to temperature changes of about 500° C. during the starting time and the operation time of the engine.

A turbocharger can be utilized to improve output. Turbochargers must withstand centrifugal forces, thermal stresses, and collisions with high-speed particles, and have good wear resistance. The force exerted when the peripheral speed of a turbocharger blade is about 500 m/sec is about 350 to 400 MPa.

A gas turbine is used for high-powered engines. The engine output is about 300 to 400 horsepower and a high temperature strength is demanded. The turbine inlet temperature is 1,270° C. to 1,350° C. Dense boron carbide ceramics are produced at holding 1,800° C., which is a low temperature for boron carbide ceramics, in a short time by the spark plasma sintering method. The boron carbide ceramics thus produced exhibit a high three-point bending strength, $\sigma_b$, of 610 MPa. In composite ceramics obtained by adding and homogeneously dispersing 15% by volume of CNF in the boron carbide ceramics, the bending strength is increased to about 710 MPa; further, the hardness is increased to about 36 GPa from 29 GPa of that achieved with no CNF addition; and the fracture toughness is increased by about 1.6 times from 4.9 MPa·m$^{1/2}$ of that achieved with no CNF addition to 7.6 MPa·m$^{1/2}$ with a 15%-CNF addition (see FIG. 9). The use of amorphous carbon and boron improves sinterability and crystalline carbon nano fiber (CNF) simultaneously added remains in $B_4C$ ceramics without being consumed during the synthesis of $B_4C$, due to lower reactivity than an amorphous one. Ranges for addition amounts of CNF have been determined. Where ordinarily only one of the strength or toughness is improved, here both are simultaneously improved. Further, a high hardness 36 GPa may be achieved.

The disclosure has been described herein in detail by way of examples and other means. However, the present invention is not limited to the constitutions and conditions described herein, and can be variously modified. For example, in wet-mixing, methanol was used in the above-mentioned examples, but another alcohol or water may be used. In the above-mentioned examples, in providing boron carbide ceramics by the spark plasma sintering method, a molded body was obtained by pressing a mixed powder by the uniaxial die molding, but the means of forming a molded body are not limited to the uniaxial die molding. Additionally, average particle diameters of various raw material, atmosphere on spark plasma sintering, pressure, temperature, electric current, and other parameters are not limited to those cited in the examples. Thus, the technology is not limited to the aspects described in the above-mentioned embodiments and the like, and those skilled in the art will be able to elicit various modifications based on the fundamental technical ideas and teachings disclosed herein.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A boron carbide ceramic prepared from a raw material mixture comprising an amorphous boron, an aluminum oxide powder, and carbon nano fibers,
   wherein the boron carbide ceramic has a relative density of approximately not less than 99%, and the carbon nanofibers are nearly homogeneously dispersed throughout the boron carbide ceramic.

2. The boron carbide ceramic of claim 1, wherein the boron carbide ceramic contains 3% to 15% by volume of the carbon nano fibers.

3. The boron carbide ceramic of claim 1, wherein the raw material mixture further comprises an amorphous carbon powder.

4. The boron carbide ceramic of claim 1, wherein the boron carbide ceramic is prepared via spark plasma sintering.

5. A method for manufacturing a boron carbide ceramic, comprising:
   providing an amorphous boron powder and an aluminum oxide powder;
   dispersing carbon nano fibers in water or alcohol to form a mixture;
   mixing the first mixture with the amorphous boron and the aluminum oxide powders to form a second mixture;
   drying the second mixture to obtain a mixed powder;
   pressing the mixed powder; and
   heating the mixed powder to raise the temperature thereof by spark plasma sintering, wherein said boron carbide ceramic has a relative density of approximately not less than 99%.

6. The method of claim 5, wherein the boron carbide ceramic contains 3% to 15% by volume of carbon nanofibers.

7. The method of claim 5, wherein the spark plasma sintering comprises heating the mixed powder in a near vacuum of not more than 10 Pa while pressing the mixed powder at a pressure of 10 MPa to 100 MPa at a temperature of 1,500° C. to 1,900° C. for 1 min. to 60 min.

8. The method of claim 5, further comprising providing an amorphous carbon powder with the amorphous boron powder and the aluminum oxide powder.

* * * * *

UNITED STATES PATENT AND TRADEMARK OFFICE
CERTIFICATE OF CORRECTION

PATENT NO. : 7,799,715 B2
APPLICATION NO. : 12/209851
DATED : September 21, 2010
INVENTOR(S) : Hirota et al.

Page 1 of 1

It is certified that error appears in the above-identified patent and that said Letters Patent is hereby corrected as shown below:

On Title Page 2, Item (56), under "OTHER PUBLICATIONS", Line 5, delete "$TiO^2$-coated $B^4C$" and insert -- $TiO_2$-coated $B_4C$ --, therefor.

On Title Page 2, Item (56), under "OTHER PUBLICATIONS", Line 6, delete "660-664." and insert -- 660-664, (Received March 7, 2001). --, therefor.

In Fig. 9A, Sheet 9 of 10, delete "$5VOL\%AL_2O_2)$" and insert -- $5VOL\% AL_2O_3)$ --, therefor.

Signed and Sealed this
Tenth Day of April, 2012

David J. Kappos
*Director of the United States Patent and Trademark Office*